United States Patent Office 3,115,798
Patented Dec. 31, 1963

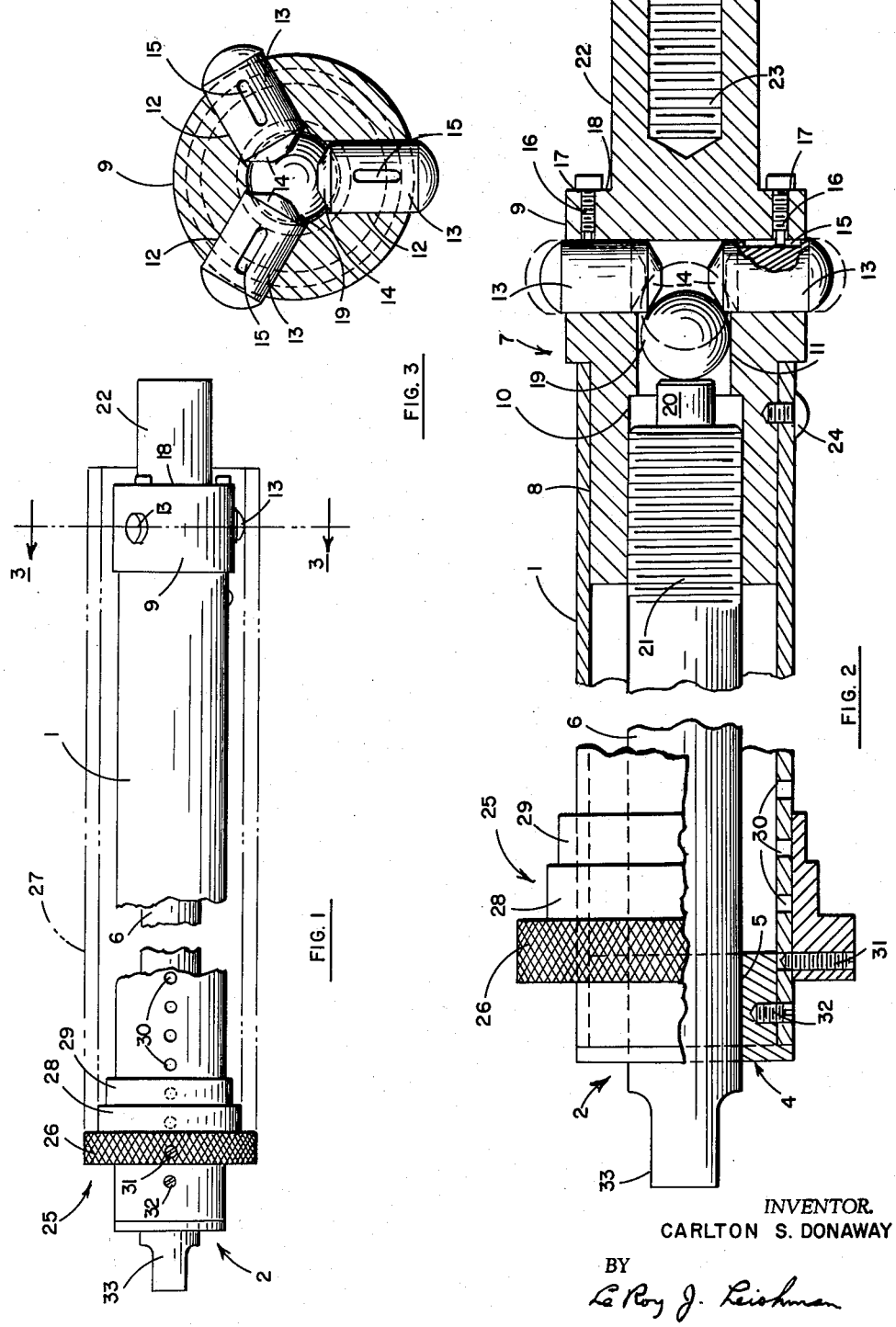

3,115,798
LATHE SPINDLE AND COLLET STOPS
Carlton S. Donaway, 18147 Archwood St., Reseda, Calif.
Filed Aug. 27, 1962, Ser. No. 219,576
7 Claims. (Cl. 82—34)

The invention described herein pertains to lathe spindle and collet stops, and more particularly to one that is adjustable as to its effective length and to the inside diameter of the particular collet closer or spindle with which it is to be used.

Most lathes with which collets may be used are somewhat limited in and of themselves as to the overall lengths of the parts that may be machined without making major adjustments. Accordingly, a major purpose of the present invention is to make it easy to control the linear dimensions of the parts being machined and to facilitate the necessary adjustments for turnbacks, facing and drilling, as well as other machine cuts and such secondary operations as may be required to be performed thereon.

Another object is to provide a lathe spindle and collet stop that is adaptable to a wide variety of lathe spindles and collets.

A further object is to provide a tool of the class described that may be easily adjustable as to its effective length.

An additional object is to make possible the ready adaption of the tool to collet closers whose inside diameters are different.

Another object is to provide a bearing support for the end of the tool remote from the collet that is adaptable to a plurality of different spindles.

A further object is to provide a device of the class described with means for attaching other tools or work pieces.

Yet another object is to provide a lathe spindle and collet stop that is low in cost, durable and accurate in its performance.

Still other objects will appear as the specification proceeds.

In the drawings:

FIG. 1 is a side elevation of my device, partly broken away, showing its manner of cooperation with the associated portion of a lathe.

FIG. 2 is a view similar to FIG. 1 with the lathe portion omitted and other portions broken away or shown in longitudinal section in order to reveal the internal construction of my device.

FIG. 3 is a view taken on line 3—3 of FIG. 1.

The components of my device are housed within, or mounted on, a tube 1. This tube has a closure 2 at one end comprising a portion 3 that is fitted to the inside diameter of the tube and an external cap portion 4 which may be formed from the same piece of material as portion 3 or it may be an independent disc secured to the internal plug portion 3. The closure 2 is provided with a concentric aperture 5, FIG. 2, which acts as a bearing for the rod 6. The opposite end of tube 1 is closed by a cylindrical member 7 comprising a plug portion 8 that fits the inside diameter of the tube 1 and an external portion 9 that may be called a plunger head. A concentric recess in the cylindrical member 7 comprises a mouth 10 having internal threads therein and a reduced recessed portion 11 that extends into the plunger head 9.

The plunger head 9 has a plurality of radially spaced apertures 12 that act as ways respectively for the plungers 13. In the embodiment that I presently prefer, the inside ends of the plungers 13 have tapered or conical ends 14 that need not have pointed tips, but only one sloping side is actually required to provide the necessary camming surface, as will be hereinafter explained.

In order to retain the plungers within the plunger head and to permit them to move within limits, each plunger has at least one slot or groove 15 therein that is closed at both ends, each of these grooves cooperating with a pin or screw 16 that extends from the body of the head 9 into the associated groove. One of these pins or screws 16 is of course provided for each plunger, and they may appropriately be formed with shoulders 17 thereon, the dimensions of parts 16 being such that when their shoulders 17 engage the outside surface 18 of the plunger head, the ends of the screws will extend into the recesses 15, but will not bottom therein. The cooperation is such that the plungers are free to move radially within limits and yet be retained within the body of the plunger head. A ball 19, having a diameter slightly less than the diameter of the reduced portion 11 of the concentric bore in the cylindrical member 7, is free to move within the recess 11, preferably with a clearance of .008" or .009". Actually, the ball 19 floats within the recess 11 while engaging the sloping surfaces of the inner ends 14 of the plungers 13. In my presently preferred embodiment, the rod or long screw 5 has a reduced end 20 and an externally threaded portion 21 adjacent thereto. These male threads are in screw-threaded engagement with the female threads on the inside of the mouth 10 of the concentric recess in member 7. If these threads are right-handed, the clockwise rotation of a screw 6 will cause the end 20 of the screw to press against the ball 19, thus urging it against the cam surfaces 14 of the plungers. As the pressure of the screw on the ball increases, the cam-like action between the ball and the tapered surfaces 14 causes the plungers to be forced upward. If the ends of the plungers are formed merely with one side that is tapered instead of like a frustum of a cone, it is of course necessary that such sloping side be opposite from the groove 15 in order that the pin or screw 16 may serve the additional purpose of keeping the sloping surface adjacent the ball.

When the plunger head 9 is positioned inside a collet closer or other machine tool, the outer ends of the plungers will engage the inside diameter of such machine tool or collet closer. Inasmuch as the plungers are of equal length and are equally spaced, the pressure of the ball against the sloping lower sides of the plungers causes them to move upwardly at a uniform rate and thus to center the head within the cylindrical walls of the machine component with which it is to cooperate and be attached.

The outer end of the plunger head may be provided with special means for attaching various tools or material that is to be machined.

In one embodiment of my invention the end section 22 has internal threads 23 for such attachment.

To prevent relative movement between member 7 and Tube 1, I provide a keying means between them. This may appropriately take the form of a screw 24, whose shoulder engages the periphery of the tube 1 and which may be threaded either into the tube or into the plug portion 8, or both.

In order to adapt may device to lathe spindles having different inside diameters, I provide a spindle support bearing 25 having sections of different diameters, these diameters being selected to correspond to the inside diameters of different lathe spindles that are commonly used.

In FIG. 1 the section 26 of the adapter sleeve or support bearing 25 is shown in engagement with the end of the lathe spindle or collet closer 27, section 28 fitting the inside walls of the spindle. However, if section 29 fits the inside walls of the lathe spindle, both sections 26 and 28 would remain outside or beyond the end of the spindle.

To accommodate my device to lathe spindles of different lengths and to work in process having different linear dimensions, I provide the tube 1 with a series of axially spaced holes 30, and the screw 31 passing through the spindle support bearing 25 may be used in connection with any one of these holes to position the support bearing in any of a variety of axial locations and to thus select any desired distance within limits between the support bearing and the plunger head 9.

The closure 2 is secured in the tube 1 by the screw 32.

To facilitate the manual rotation of the long screw 6, the outer end is keyed as at 33 in order to permit the use of a wrench or other appropriate crank.

Various modifications may of course be made in the structure hereinbefore provided, and the components may not only be altered in form but may be replaced by other components which perform the same or additional functions. Furthermore, the various parts may be rearranged and transposed, all such variations coming within the clear scope of the appended claims.

My claims are:

1. In a lathe spindle and collet stop, a combination including: a tube having a plurality of axially spaced holes near one end thereof; a closure for said one end having a concentric opening therethrough; a cylindrical member having (a) a first section extending into said tube through its other end, (b) a second intermediate section positioned outside said tube and (c) an outermost section for attaching a rotatable structure thereto, said member having a concentric recess extending axially into said intermediate section from the end of said first section that faces said closure, the mouth of said concentric recess being internally threaded and the remainder of said recess having a reduced diameter, and said intermediate section having at least three radial apertures extending from the periphery thereof into the reduced diameter portion of said recess, said member rigidly connected to said tube; plungers mounted for radial movement within said apertures, the inner ends of said plungers each having at least one sloping side and a recess with closed ends extending longitudinally along at least one side above the sloping portion; a plurality of pins each individual to one of said recesses extending axially of said intermediate section into said recesses for limiting the radial movement of the plungers within said apertures; a ball floating within the reduced diameter portion of said recess and contacting the sloping sides of said plungers; a rod reduced to a diameter at one end that is less than the diameter of said ball, said rod having peripheral threads near its reduced end that are in screw-threaded engagement with the threads within the mouth of said recess, said rod so mounted for rotation within said closure that upon rotation in one rotative direction the reduced end thereof will press said ball against the sloping sides of said plungers and force them radially outward; and an adapter bearing surrounding said tube and having an indexing element therein extending into one of said axially spaced holes.

2. In a lathe spindle and collet stop, a combination including: a tube having a plurality of axially spaced holes near one end thereof; a closure for said one end having a concentric opening therethrough; a cylindrical member having (a) a first section extending into said tube through its outer end, (b) a second intermediate section positioned outside said tube and (c) an outermost section for attaching a rotatable structure thereto, said member having a concentric recess extending axially into said intermediate section from the end of said first section that faces said closure, the mouth of said concentric recess being internally threaded and the remainder of said recess having a reduced diameter, said intermediate section having at least three radial apertures extending from the periphery thereof into the reduced diameter portion of said recess, said member rigidly connected to said tube; plungers mounted for radial movement within said apertures, said plungers each having a generally conical inner end and a recess with closed ends extending longitudinally along at least one side of the plunger; a plurality of pins each individual to one of said recesses extending axially of said intermediate section into said recesses for limiting the radial movement of the plungers within said apertures; a ball floating within the reduced diameter portion of said recess and contacting the conical sides of said plungers; a rod reduced to a diameter at one end that is less than the diameter of said ball, said rod having peripheral threads near its reduced end that are in screw-threaded engagement with the threads within the mouth of said recess, said rod so mounted for rotation within the closure that upon rotation in one rotative direction the reduced end thereof will press said ball against the conical sides of said plungers and force them radially outward; and an adapter bearing surrounding said tube and having an indexing element therein extending into one of said axially spaced holes, said adapter bearing having at least one section of such diameter that it will fit the inner walls of a lathe spindle.

3. In a lathe spindle and collet stop, a combination including: a tube; a closure for one end of said tube having a concentric opening therethrough; a cylindrical member having (a) a first section extending into said tube through its other end, (b) a second intermediate section positioned outside said tube and (c) an outermost section for attaching a rotatable structure thereto, said member having a concentric recess extending axially into said intermediate section from the end of said first section that faces said closure, the mouth of said concentric recess being internally threaded and the remainder of said recess having a reduced diameter, said intermediate section having at least three radial apertures extending from the periphery thereof into the reduced diameter portion of said recess, said member rigidly connected to said tube; plungers mounted for radial movement within said apertures, said plungers each having a generally conical inner end and a recess with closed ends extending longitudinally along at least one side of the plunger; a plurality of pins each individual to one of said recesses extending axially of said intermediate section into said recesses for limiting the radial movement of the plungers within said apertures; a ball floating within the reduced diameter portion of said recess and contacting conical sides of said plungers; and a rod reduced to a diameter at one end that is less than the diameter of said ball, said rod having peripheral threads near its reduced end that are in screw-threaded engagement with the threads within the mouth of said recess, said rod so mounted for rotation within said closure that upon rotation in one rotative direction the reduced end thereof will press said ball against the conical sides of said plungers and force them radially outward.

4. In a lathe spindle and collet stop, a combination including: a tube; a closure for one end of said tube having a concentric opening therethrough; a cylindrical member having (a) a first section extending into said tube through its other end, (b) a second intermediate section positioned outside said tube and (c) an outermost section for attaching a rotatable structure thereto, said member having a concentric recess extending axially into said intermediate section from the end of said first section that faces said closure, the mouth of said concentric recess being internally threaded and the remainder of said recess having a reduced diameter, said intermediate section having at least three radial apertures extending from the periphery thereof into the reduced diameter portion of said recess, said member rigidly connected to said tube; plungers mounted for radial movement within said apertures, said plungers each having a generally conical inner end and a recess with closed ends extending longitudinally along at least one side of the plunger; a plurality of pins each individual to one of said recesses extending axially of said intermediate section into said recesses for limiting the radial movement of the plungers within said apertures; a ball floating within the reduced diameter portion of said recess and contacting the conical sides of said plungers; a rod reduced to a diameter at one end that is less than the diameter of said ball, said rod having peripheral threads near its reduced end that are in screw-threaded engagement with the threads within the mouth of said recess, said rod so mounted for rotation within said closure that upon rotation in one rotative direction the reduced end thereof will press said ball against the conical sides of said plungers and force them outward, the end of said rod remote from said peripheral threads being keyed to receive a tool to facilitate the manual rotation of said rod.

5. In a lathe spindle and collet stop, a combination including: a tube; a closure for one end of said tube having a concentric opening therethrough; a cylindrical member having (a) a first section extending into said tube through its other end, (b) a second intermediate section positioned outside said tube and (c) an outermost section for attaching a rotatable structure thereto, said member having a concentric recess extending axially into said intermediate section from the end of said first section that faces said closure, the mouth of said concentric recess being internally threaded and the remainder of said recess having a reduced diameter, said intermediate section having at least three radial apertures extending from the periphery thereof into the reduced diameter portion of said recess, said member rigidly connected to said tube; plungers mounted for radial movement with said apertures, said plungers being to substantially uniform length and each having a generally conical inner end, a rounded outer end and a recess with closed ends extending longitudinally along at least one side of the plunger; a plurality of pins each individual to one of said recesses extending axially of said intermediate section into said recesses for limiting the radial movement of the plungers within said apertures; a ball floating within the reduced diameter portion of said recess and contacting the conical sides of said plungers; and a rod reduced to a diameter at one end that is not greater than the diameter of said ball, said rod having peripheral threads near its reduced end that are in screw-threaded engagement with the threads within the mouth of said recess, said rod so mounted for rotation within said closure that upon rotation in one rotative direction the reduced end thereof will press said ball against the conical sides of said plungers and force them radially outward.

6. In a lathe spindle and collet stop, a combination including: a tube; a closure for one end of said tube having a concentric opening therethrough; a cylindrical member having a first section extending into said tube through its other end, and a second section positioned outside said tube for insertion in a collet closer, said member having a concentric recess extending axially into said second section from the end of said first section that faces said closure, the mouth of said concentric recess being internally threaded and the remainder of said recess having a reduced diameter, said second section having at least three radial apertures extending from the periphery thereof into the reduced diameter portion of said recess, said member rigidly connected to said tube; plungers mounted for limited radial movement within said apertures and each having a generally conical inner end; a ball within the reduced diameter portion of said recess and contacting the conical sides of said plungers; and a rod having a reduced diameter at one end that is not greater than the diameter of said ball, said rod having peripheral threads near said reduced end that are in screw-threaded engagement with the threads within the mouth of said recess, said rod so mounted for rotation within said closure that upon rotation in one rotative direction the reduced end thereof will press said ball against the conical sides of said plungers and force them radially outward against the inside walls of a collet closer.

7. In a lathe spindle and collet stop, a combination including: a tube; a closure for one end of said tube having a concentric opening therethrough; a cylindrical member having a first section extending into said tube through its other end, and a second section positioned outside said tube for insertion in a collet closer, said member having a concentric recess extending axially into said second section from the end of said first section that faces said closure, the mouth of said concentric recess being internally threaded and the remainder of said recess having a reduced diameter, said second section having at least three radial apertures extending from the periphery thereof into the reduced diameter portion of said recess, said member rigidly connected to said tube; plungers mounted for limited radial movement within said apertures and each having a generally conical inner end; a ball within the reduced diameter portion of said recess and contacting the conical sides of said plungers; a rod having a reduced diameter at one end that is not gerater than the diameter of said ball, said rod having peripheral threads near said reduced end that are in screw-threaded engagement with the threads within the mouth of said recess, said rod so mounted for rotation within said closure that upon rotation in one rotative direction the reduced end thereof will press said ball against the conical sides of said plungers and force them radially outward against the inside walls of a collet closer; and an adapter bearing surrounding said tube and having at least three axially adjacent sections of different diameters, the diameters of the two bearing sections that are closest to the second section of said cylindrical member being such that each of said two will fit the inside walls of a different lathe spindle, the third section of said adapter bearing having a greater diameter than that of the other two so that it may be positioned outside of said spindle when either of the other two sections of the adapter bearing is positioned within said spindle.

No references cited.